US008655316B2

(12) United States Patent
Kim et al.

(10) Patent No.: US 8,655,316 B2
(45) Date of Patent: Feb. 18, 2014

(54) METHOD FOR CONTROLLING ACCESS OF TERMINAL TO HOME (E)NODEB (75) Inventors: Tae-Hyeon Kim, Gyeonggi-Do (KR); Lae-Young Kim, Gyeonggi-Do (KR); Hyun-Sook Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 13/255,327

(22) PCT Filed: Nov. 11, 2009

(86) PCT No.: PCT/KR2009/006625
§ 371 (c)(1),
(2), (4) Date: Sep. 8, 2011

(87) PCT Pub. No.: WO2010/110519
PCT Pub. Date: Sep. 30, 2010

(65) Prior Publication Data
US 2012/0009901 A1 Jan. 12, 2012

Related U.S. Application Data (60) Provisional application No. 61/162,649, filed on Mar. 23, 2009, provisional application No. 61/173,973, filed on Apr. 30, 2009.

(30) Foreign Application Priority Data

Aug. 17, 2009 (KR) ........................ 10-2009-0075887

(51) Int. Cl.
*H04M 1/66* (2006.01)
(52) U.S. Cl.
USPC ........ 455/411; 455/435.1; 455/436; 455/437; 455/438; 455/439

(58) Field of Classification Search
None
See application file for complete search history.

(56) References Cited

U.S. PATENT DOCUMENTS

2007/0183427 A1  8/2007  Nylander et al.
2007/0213060 A1  9/2007  Shaheen
(Continued)

FOREIGN PATENT DOCUMENTS

| CN | 101296451 A | 10/2008 |
| KR | 10-2007-0073365 A | 7/2007 |
| WO | WO 2007/089560 A1 | 8/2007 |

OTHER PUBLICATIONS

3rd General Partnership Project; Techincal Specification Group Services and System Aspects; General Packet Radio Service (GPRS) Enhancements for Evolved Universal Terrestrial Radio Access Network, (E-UTRAN) Access (Release 9), 3GPP TS 23.401, V9.5.0 (Jun. 2010), pp. 1-259.

(Continued)

*Primary Examiner* — Suhail Khan
(74) *Attorney, Agent, or Firm* — Birch, Stewart, Kolasch & Birch, LLP (57) ABSTRACT

A method for controlling access of a terminal, which is connected to a Home (e)NodeB operated in a closed access mode, the method comprises: determining whether a timer, which designates allowable time to access to the Home (e)NodeB by using a specific closed subscriber group (CSG) ID, has expired; comparing an allowed CSG list for the terminal with a CSG ID list of the Home (e)NodeB if the allowed access timer has expired; and changing the specific CSG ID of the terminal into another CSG ID such that service to the terminal from the Home (e)NodeB is maintained if there is the another CSG ID in both the allowed CSG ID list for the terminal and the CSG ID list of the Home (e)NodeB.

13 Claims, 7 Drawing Sheets

(56) References Cited

U.S. PATENT DOCUMENTS

| | | |
|---|---|---|
| 2007/0291695 A1 | 12/2007 | Sammour et al. |
| 2008/0043658 A1 | 2/2008 | Worrall |
| 2008/0090583 A1 | 4/2008 | Wang et al. |
| 2009/0005050 A1 | 1/2009 | Lee et al. |
| 2009/0047960 A1 | 2/2009 | Gunnarsson et al. |
| 2009/0129342 A1 | 5/2009 | Hwang et al. |
| 2011/0116477 A1* | 5/2011 | Wu .............................. 370/331 |
| 2011/0269468 A1 | 11/2011 | Sundell et al. |

OTHER PUBLICATIONS

"HNB and HeNB Requirements," Nokia Corporation, Nokia Siemens Networks, 3GPP TSG-RAN WG2 Meeting #61bis R2-081527, 5 pages, Apr. 4, 2008.

* cited by examiner

METHOD FOR CONTROLLING ACCESS OF TERMINAL TO HOME (E)NODEB

This application is a National Phase of PCT/KR2009/006625 filed on Nov. 11, 2009, which claims priority under 35 USC 119(e) to U.S. Provisional Application Nos. 61/162,649 and 61/173,973filed on Mar. 23, 2009 and Apr. 30, 2009, respectively and under 35USC 119(a) to Patent Application Ser. No. 10-2009-0075887 filed in Republic of Korea, on Aug. 17, 2009, all of which are hereby expressly incorporated by reference into the present application.

TECHNICAL FIELD

The present invention relates to a mobile communication system, and particularly, to a Home(e)NodeB system in a mobile communication system.

BACKGROUND ART

In the field of 3GPP that regulates technical standards of the third generation mobile communication system, since the end of 2004, has started researches for Long Term Evolution/System Architecture Evolution (LTE/SAE) techniques to optimize and enhance functions of 3GPP techniques in correspondence to a plurality of forums and new techniques relevant to the $4^{th}$ generation mobile communication.

The SAE based on the 3GPP SA WG2 relates to a network technique for determining a network structure and supporting mobility of a heterogeneous radio network system with cooperating with an LTE operation of the 3GPP TSG RAN. The SAE, one of the most important standardization issues of the 3GPP, is implemented to develop a 3GPP system into a system that supports various wireless access techniques based on IP. More concretely, the SAE has been implemented for an optimized packet-based system capable of minimizing transmission delay with an enhanced data transmission capability.

A conceptual reference model of the SAE, defined by 3GPP SA WG2 includes a non-roaming case, and a roaming case having various scenarios. Details of the conceptual reference model can be referred from TS 23.401 and TS 23.402 which are 3GPP standard documents. This may be schematically reconfigured in FIG. 1.

Figure 1:
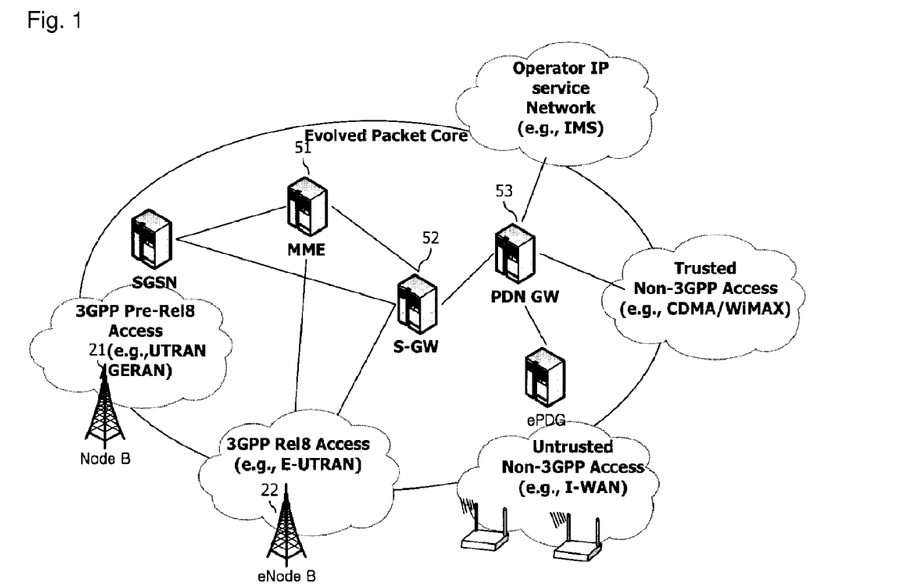
FIG. 1 is a structural view of an evolved mobile communication network.

FIG. 1 is a structural view of an evolved mobile communication network.

One of the most representative characteristics of the network of FIG. 1 is that a structure is based on a two-layer model (2 Tier Model), an evolved NodeB (so-called eNodeB) of an Evolved UTRAN and a Gateway of a Core Network. The eNodeB has similar functions to them of both a RNC and a NodeB of the conventional UMTS system. And, the Gateway has a similar function to it of the conventional SGSN/GGSN.

Another important characteristic of the network is that a Control Plane and a User Plane between an Access Network and a Core Network are interchanged to each other through different interfaces. In the conventional UMTS system, one interface (Iu) exists between an RNC and an SGSN. However, since a Mobility Management Entity (MME) which processes a control signal is separated from a Gateway (GW), two interfaces (i.e, S1-MME and S1-U) were respectively used.

Figure 2:
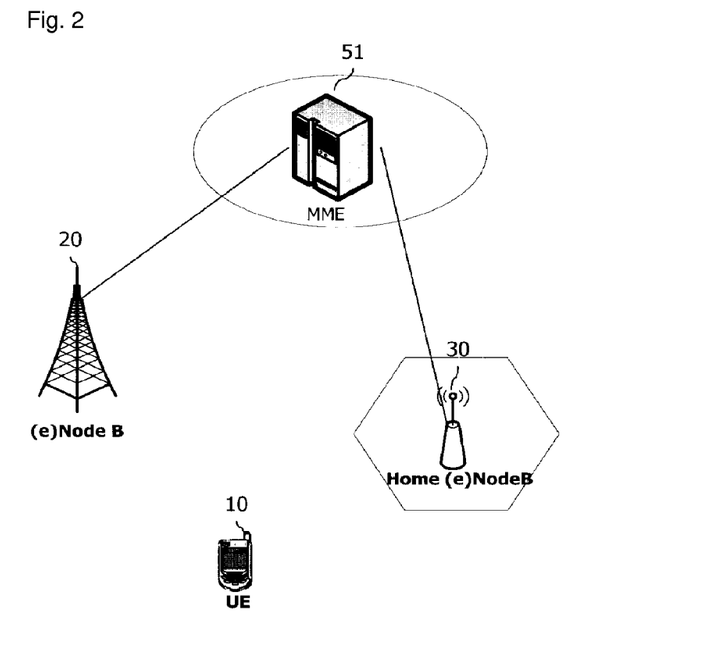
FIG. 2 shows a relation between an (e)NodeB and a Home (e)NodeB.

FIG. 2 shows an (e)NodeB and a Home (e)NodeB.

In the $3^{rd}$ or $4^{th}$ generation mobile communication system, efforts to increase a cell capacity have been ongoing in order to support high-capacity service such as multimedia contents and streaming, and a bi-directional service.

As various techniques for transmitting a large amount of data in addition to multimedia relating techniques are required, many methods for increasing wireless capacity have been researched. One of the methods include a method for allocating frequency resources as much as possible. However, there have been limitations in allocating limited frequency resources to a plurality of users as much as possible.

In order to increase a cell capacity, there are efforts to use a high frequency bandwidth, and to reduce a cell radius. When cells having a small radius, such as pico cells are used, a frequency bandwidth of the cell can increase highly than that in the conventional cellular system thus to transmit more information. However, in this case, more base stations have to be installed in the same area, which results in high costs.

In order to increase a cell capacity by using a small cell, a Home (e)NodeB 30 has been proposed.

The Home (e)Node 30 has been researched based on RAN WG3 of the 3GPP (e)NodeB, and is being intensively applied to SA WG.

Referring to FIG. 2, an (e)NodeB (or NodeB) 20 may correspond to a macro-base station, whereas a Home (e)NodeB (or Home NodeB) 30 may correspond to a femto-base station. In the specification, the terms will be explained based on the 3GPP. And, the (e)NodeB 20 will be used so as to indicate 'NodeB' or 'eNodeB', and the Home (e)NodeB 30 will be used so as to indicate 'Home NodeB' or 'Home eNodeB'.

A cell of the Home (e)NodeB 20 is implemented in an Open Access Mode, a Closed Access Mode, and a Hybrid Access Mode.

In the case of the Open Access mode, the cell of the Home (e)NodeB 20 provides service to all serviceable terminals without limitations.

In the case of the Closed Access mode, the cell of the Home (e)NodeB 20 permits access of only allowed terminals.

In UMTS/EPS of the 3GPP standard, it has been proposed that one or more Home (e)NodeBs operated in the Closed Access mode forms one Closed Subscriber Group (CSG). That is, one CSG may be composed of one or more Home (e)NodeBs, and the terminal also receives a one permission (e.g., one CSG membership) to access the cells of the Home (e)NodeBs. Here, the terminal may have one or more CSG membership to access one or more CSGs, and may have time information allowed according to each CSG. Information on accessible CSGs is called as an Allowed CSG List. This allowed CSG list is stored in the terminal, and a network entity such as MME, SGSN, MSC, HSS, and HLR.

Access control is performed according to the allowed CSG list. For instance, if accessible time to the CSG has expired or a permission to access the CSG has been deleted (or expired) while the terminal receives service, a handover to a suitable cell is executed. That is, a handover to a peripheral CSG, or to a NodeB (or eNodeB) corresponding to a macro-base station is executed.

In the related art, if accessible time to the CSG has expired or a permission to access the CSG has been deleted, the terminal may execute a handover to a suitable cell. However, concrete methods thereof have not been disclosed.

In order to perform a handover from a first CSG to which the terminal is being accessed to a second CSG, a status of wireless resources (i.e. whether the terminal is accessible to the second CSG) has to be considered. However, this has not been disclosed in the related art.

For the consideration, signal transmission between relevant entities is required as much as possible. However, the related art has not disclosed appropriate solutions relating thereto, which causes waste of wireless resources.

Furthermore, even if the terminal has not found a suitable CSG, a handover to a macro-cell (NodeB or eNodeB) has to be executed so as to ensure service continuity. This may depart from the original purpose of the Home (e)Node B for reducing the amount of resources usage by the macro base station.

DISCLOSURE OF INVENTION

Solution to Problem

Therefore, an object of the present invention is to provide a method for allowing a terminal to perform a handover to a cell of a Home (e)NodeB corresponding to another closed subscriber group (CSG).

Another object of the present invention is to provide a method capable of efficiently using wireless resources of a Home (e)NodeB and a macro base station, and capable of minimizing signaling exchange while ensuring service continuity to a terminal when accessible time to a closed subscriber group (CSG) has expired or a permission to access the CSG has been deleted.

To achieve these and other advantages and in accordance with the purpose of the present invention, as embodied and broadly described herein, there is provided a method for controlling access of a terminal, which is connected to a Home (e)NodeB operated in a closed access mode, the method comprising: determining whether a timer, which designates allowable time to access to the Home (e)NodeB by using a specific closed subscriber group (CSG) ID, has expired; comparing an allowed CSG list for the terminal with a CSG ID list of the Home (e)NodeB if the timer has expired; and changing the specific CSG ID of the terminal into another CSG ID such that service to the terminal from the Home (e)NodeB is maintained if there is the another CSG ID in both the allowed CSG ID list for the terminal and the CSG ID list of the Home (e)NodeB.

At least one of the determining, comparing, and changing may be executed by at least one of the Home (e)NodeB and a specific entity of a core network.

The step of determining may comprise receiving a message notifying that the timer has expired, from a specific entity, which is located in a core network and monitors the timer.

The step of determining may comprise monitoring the timer by the Home (e)NodeB.

The method may further comprise requesting and acquiring the allowed CSG ID list for the terminal when the timer has expired.

The allowed CSG ID list of the terminal may be acquired by request from the terminal or a Mobility Management Entity (MME).

The step of comparing may comprise requesting and acquiring, by the Home (e)NodeB, the allowed CSG ID list for the terminal from the terminal; and comparing, by the Home (e)NodeB, the acquired allowed CSG ID list with the CSG ID list of the Home (e)NodeB.

The step of changing may comprise transmitting, by the Home (e)NodeB, to the terminal and the core network a message for changing the specific CSG ID of the terminal to said another CSG ID.

According to another embodiment of the present invention, there is provided a method for controlling access of a terminal, which is connected to a Home (e)NodeB operated in a closed access mode, the method comprising: requesting a CSG ID list of the Home (e)NodeB if a timer, which designates allowable time to access to the Home (e)NodeB by using the specific CSG ID, has expired; comparing the acquired CSG ID list of the Home (e)NodeB with an allowed CSG ID list for the terminal when the CSG ID list of the Home (e)NodeB has been acquired; and changing the specific CSG ID of the terminal into said another CSG ID such that service to the terminal from the Home (e)NodeB is maintained if there is the another CSG ID in both the allowed CSG ID list for the terminal and the CSG ID list of the Home (e)NodeB.

In the present invention, access of the terminal to the Home (e)NodeB may be effectively controlled by minimizing signaling exchange in a network, and by reducing the amount of resources usage of a macro base station.

Especially, when accessible time of the terminal to the CSG has expired or a permission of the terminal to access the CSG has been deleted, unnecessary handovers are prevented through suitable access control. This may enhance the efficiency of the network and wireless resources.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Description will now be given in detail of the present invention, with reference to the accompanying drawings.

The present invention is applied to a Home (e)NodeB system. However, the present invention is not limited to this, but may be applied to all communication systems and methods to which the techniques of the present invention are applicable.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art.

Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is judged that detailed descriptions of the related art are not within the range of the present invention, the detailed descriptions will be omitted.

Hereinafter, the term of a 'mobile terminal' will be used. The mobile terminal may be also referred to as a user equipment (UE), a mobile equipment (ME), and a mobile station (MS). The UE may be a mobile device having a communication function, such as a portable phone, a PDA, a smart phone, and a notebook. Also, the UE may be an immobile device such as a PC and a vehicle mounted device.

And, the term of a 'Home (e)NodeB' will be used hereinafter. The 'Home (e)NodeB may be referred to as a 'femtocell', a 'home NodeB', and a 'home eNodeB'.

Definition of Terms

Hereinafter, the terms used in the present invention will be briefly defined for understanding.

UMTS: An abbreviation of a Universal Mobile Telecommunication System, which signifies the 3rd generation mobile communication network.

EPS: An abbreviation of an Evolved Packet System, which signifies a core network that supports a long term evolution (LTE) network, and a network evolved from the UMTS.

NodeB: A base station of a UMTS network, which is installed outdoors and has a cell coverage size corresponding to a macro cell.

eNodeB: A base station of an EPS network, which is installed outdoors and has a cell coverage size corresponding to a macro cell.

(e)NodeB: A term indicating a NodeB and an eNodeB.

Home NodeB: A base station of a UMTS network, which is installed indoors and has a cell coverage size corresponding to a femto cell.

Home eNodeB: A base station of an EPS network, which is installed indoors and has a cell coverage size corresponding to a femto cell.

Home (e)NodeB: A term indicating a Home NodeB and a Home eNodeB.

Home (e)NodeB gateway: A gateway performing an interfacing with a core network by being connected to one or more Home(e)NodeBs.

Home (e)NodeB sub-system: A sub-system that manages a wireless network by combing a Home (e)NodeB and a Home (e)NodeB gateway as one set. The Home (e)NodeB sub-system and the Home (e)NodeB manage a wireless network, and are interworked with a core network. Therefore, the Home (e)NodeB sub-system and the Home (e)NodeB may be considered as one set. Accordingly, the terms of the Home (e)NodeB and the Home (e)NodeB sub-system will be used together.

Access control: An operation to allow access of a terminal to a system such as a Home (e)NodeB, or to handover the terminal to other access system.

Service continuity: A function to maintain the current service even if a service direction in a mobile communication system is changed to other cell or access system.

Closed Subscriber Group (CSG): A term indicating one or more Home (e)NodeB groups. The Home (e)NodeB groups that belong to the CSG have the same CSG identifier (ID). And, each user receives a permission message according to each CSG.

PCC (Policy and Charging Control): An operation for an operator's policy and charging.

PCRF (Policy and Charging Rule Function): A network element for performing the PCC, and provides an operator policy and a charging rule to another entity.

The Concept of the Method Disclosed in the Specification

In the present invention, even if accessible time to the CSG has expired or a permission to access the CSG has been deleted, the frequency of handovers is reduced as much as possible. Accordingly, the efficiency of the access control is enhanced. That is, it is determined whether or not a cell of the Home (e)NodeB to which a terminal is being accessed can continuously provide service to the terminal. This may allow unnecessary handovers to be reduced, thereby enhancing management of a network and wireless resources.

Hereinafter, the method for controlling access in a Home (e)NodeB will be explained in more detail with reference to the attached drawings.

Figure 3:
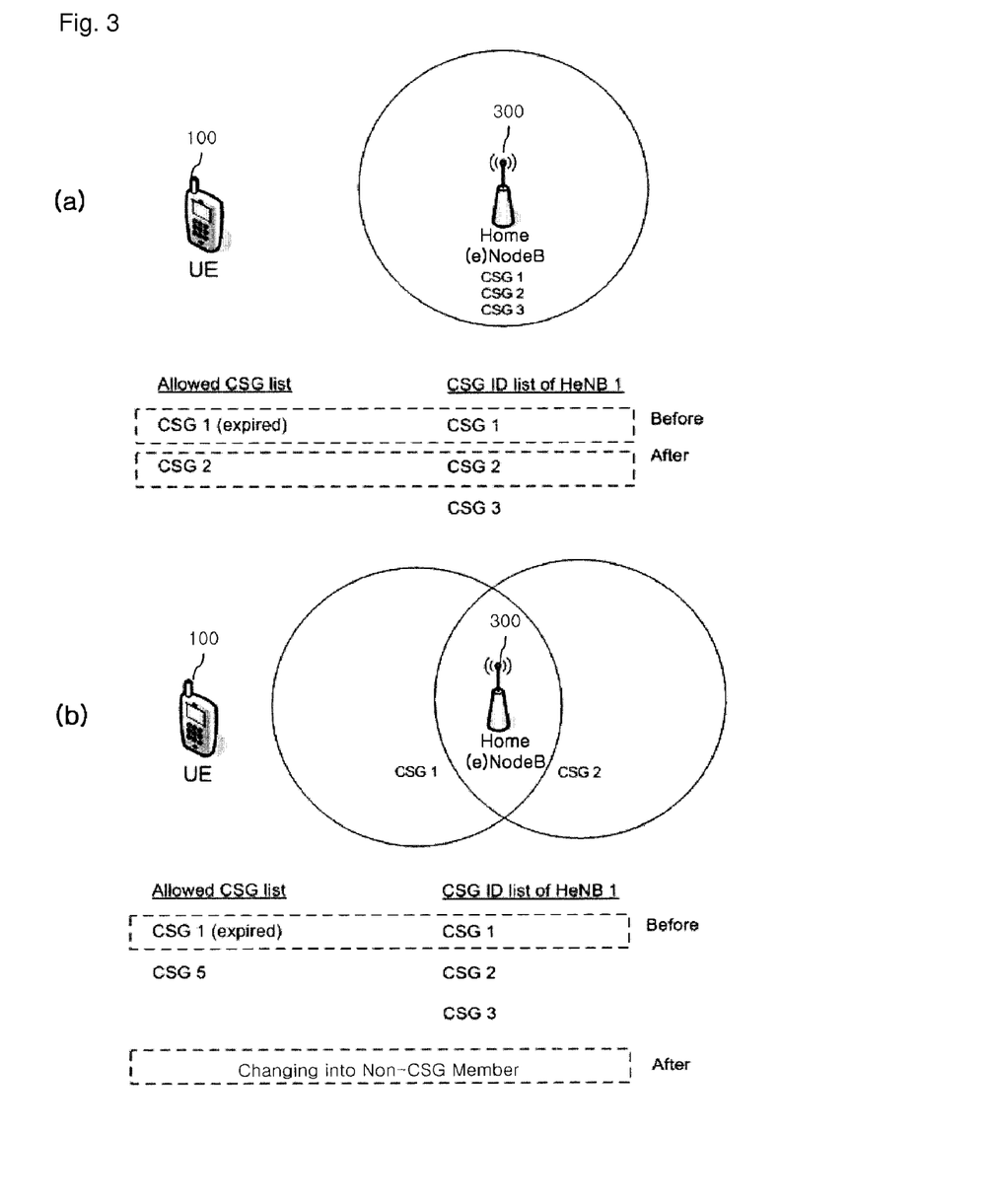
FIG. 3 is conceptual views of access modes for explanation of preferred embodiments of the present invention.

FIG. 3 is conceptual views of access modes for explanation of preferred embodiments of the present invention.

The Home (e)NodeB 300 may operate in a Closed Access Mode, an Open Access Mode, and a Hybrid Access Mode. In the closed access mode (or limited access mode), only terminals having CSG membership (or accounts) are accessible to the Home (e)NodeB 300. In the open access mode, the Home (e)NodeB 300 operates in the same manner as a normal cell having no concept of a CSG. In this case, all UEs are accessible to the Home (e)NodeB 300. In the hybrid access mode, the Home (e)NodeB 300 operates in both the closed access mode and the open access mode.

The open access mode is not within the range of the present invention. Accordingly, FIG. 3 shows an access control method in the closed access mode and the hybrid access mode.

FIG. 3A shows an example of the closed access mode. In the closed access mode, the Home (e)NodeB 300 operates as a closed subscriber group (CSG). The Home (e)NodeB 300 stores an ID list of CSGs. For instance, the Home (e)NodeB supports a first CSG (a CSG ID is "CSG 1"), a second CSG (a CSG ID is "CSG 2"), and a third CSG (a CSG ID is "CSG 3").

Referring to FIG. 3A, the terminal (or UE 100) has memberships (or accounts) to the first CSG ("CSG 1") and the second CSG ("CSG 2") of the Home (e)NodeB 300 and is connected to the Home (e)NodeB 300 by using a membership to the first CSG ("CSG 1") thus to receive a service.

In such situation, even if accessible time (or allowed time) of the current membership (or account) to the first CSG ("CSG 1") has expired, the Home (e)NodeB 300 can not handover the terminal (or UE 100) to other base station such as other Home (e)NodeB. Instead, the Home (e)NodeB 300 can change the current CSG ID ("CSG 1") for the terminal (or UE 100) into another CSG ID (or a different CSG ID or new CSG ID)(e.g., "CSG 2") to maintain a provision of the service to the UE 100.

To do this, the Home (e)NodeB 300 compares its CSG ID list with an allowed CSG list for the UE 100. The allowed CSG list includes information on CSGs to which the terminal (or UE 100) has a membership. As illustrated in FIG. 3A, the allowed CSG list includes information on the first CSG ("CSG 1") and the second CSG ("CSG 2").

As results from the comparison, it is determined that at least one CSG ID in the CSG list of the Home (e)NodeB 300 is matched with it in the allowed CSG list for the UE 100 (or there is at least one matched CSG ID in both the lists), and the matched CSG ID has not expired yet, a membership to the matched CSG ID having not expired yet can be used.

Figure 4:
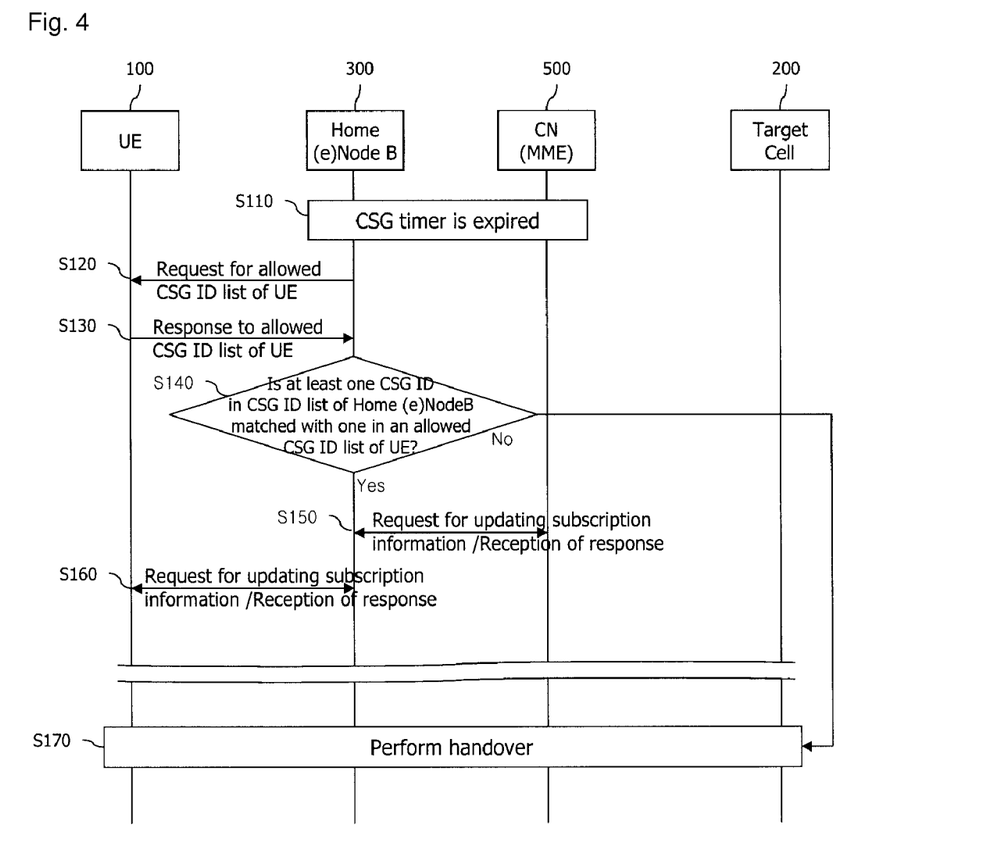
FIG. 4 is a flowchart showing a method for controlling access in a Home (e)NodeB operated in a closed access mode according to a first embodiment of the present invention.
Figure 5:
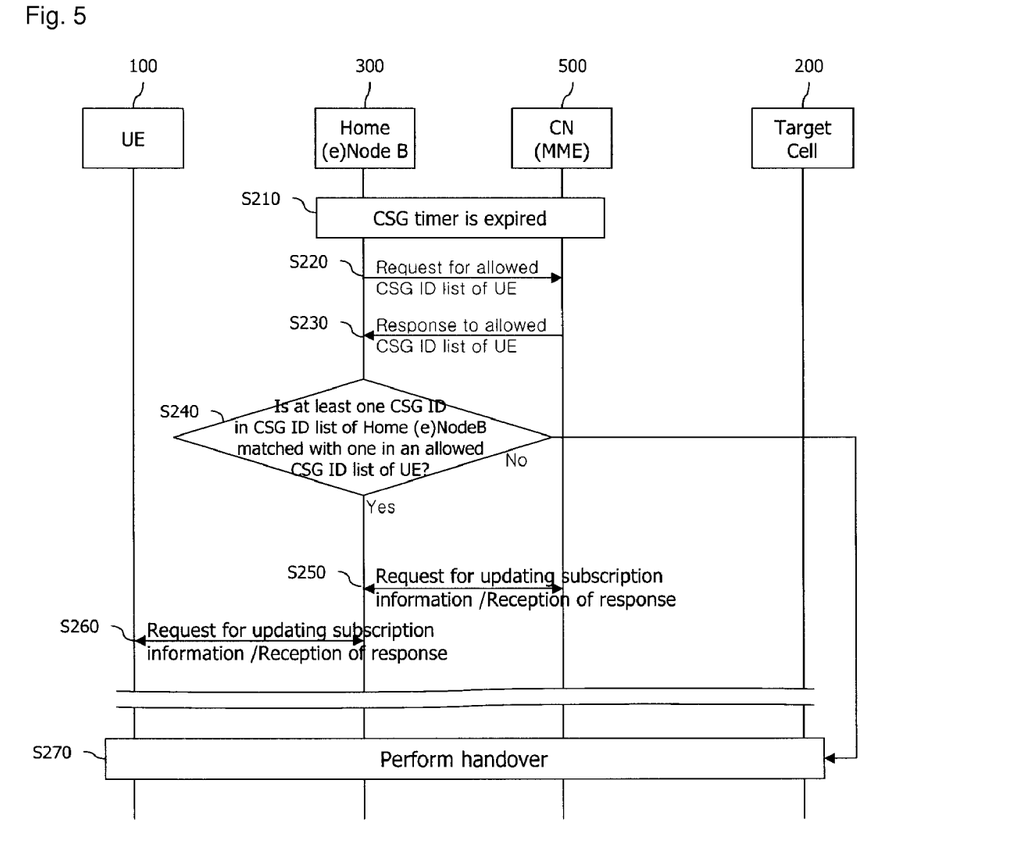
FIG. 5 is a flowchart showing a method for controlling access in a Home (e)NodeB operated in a closed access mode according to a second embodiment of the present invention.
Figure 6:
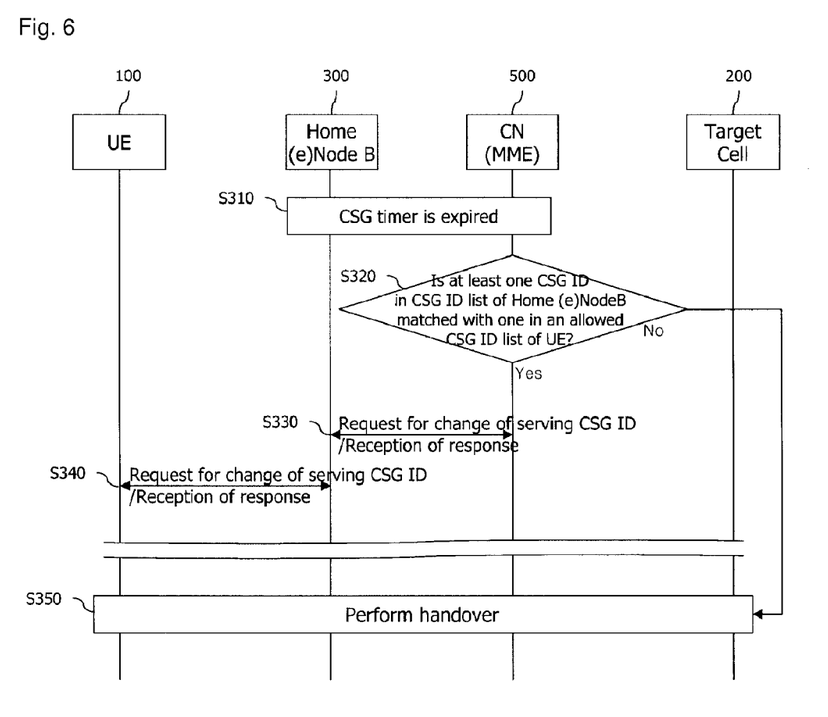
FIG. 6 is a flowchart showing a method for controlling access in a Home (e)NodeB operated in a closed access mode according to a third embodiment of the present invention.

As shown in FIGS. 4 to 6, there area various methods for changing the current CSG ID for the UE to another CSG ID for service continuity to the UE 100 For example, the various methods may be performed between the UE 100 and the Home (e)NodeB 300, or between the Home (e)NodeB 300 and a network entity, or by the network entity 500, exclusively. This will be explained in more detail with reference to FIGS. 4 to 6. Here, the network entity may also indicate a Home Subscriber Server (HSS), an Application Server (AS), a Home Location Register (HLR), a User Repository, etc. The network entity to be explained hereinafter signifies at least one of the aforementioned entities, or the combination thereof.

FIG. 3B shows an example of the hybrid access mode.

The Home (e)NodeB 300 operated in the hybrid access mode provides services to both UEs having a CSG membership, and UEs having not the CSG membership (or UEs of a non-CSG). In other words, the UEs of a non-CSG may use the Home (e)NodeB without any membership (or permission). However, the UEs in the non-CSG may access to the Home (e)NodeB with a service quality lower than that in the CSG.

The terminal (or UE 100) has a membership (or accounts) to the first CSG ("CSG 1") of the Home (e)NodeB 300 and a membership to "CSG 5" of other Home (e)NodeB and is connected to the Home (e)NodeB 300 by using the membership to the first CSG ("CSG 1") thus to receive a service.

In such situation, even If an accessible time (or allowed time) of the current membership of the terminal to the first CSG ("CSG 1") has expired, the Home (e)NodeB 300 checks whether the membership of the UE 100 can be changed to a non-CSG member. according to a result of the check, the membership of the UE 100 is changed to a non-CSG member. Then, the current service is continuously maintained.

FIG. 4 is a flowchart showing a method for controlling access in a Home (e)NodeB operated in a closed access mode according to a first embodiment of the present invention.

FIG. 4 shows a UE 100, a Home (e)NodeB (e.g., femtobase station), a core network (CN) 500, and a target cell 200.

The core network 500 may include a Mobility Management Entity (MME), a serving GPRS support node (SGSN), a Mobile-services Switching Centre (MSC), a Home Subscriber Server (HSS), a Home Location Register (HLR), a User Repository, etc. The target cell 200 may be a femto-base station such as the Home (e)NodeB 300, or a macro-base station such as an (e)NodeB.

According to the first embodiment of the present invention, if accessible time (or allowed time) of the current membership of the terminal to a current (or specific) CSG ID of the Home (e)NodeB 300 has expired while the UE 100 is receiving a service from the Home (e)NodeB 300, the Home (e)NodeB 300 compares a CSG ID list stored therein with an allowed CSG ID list for the UE 100. As results from the comparison, it is determined that at least one CSG ID in the CSG ID list for the UE 100 is matched with it in the CSG ID list of the Home (e)NodeB 300, the Home (e)NodeB 300 changes the current (or specific) CSG ID for the UE 100 to another CSG ID (or new CSG ID)(i.e., the matched CSG ID) without any handover. Accordingly, the Home (e)NodeB 300 may continuously provide service to the UE 100. Once the current (or specific) CSG ID for the UE 100 is changed to the another CSG ID, the Home (e)NodeB 300 informs the changed status to the core network 500, thereby updating the changed status.

This will be explained in more detail with reference to FIG. 4.

1) While the Home (e)NodeB 300 provides service to the UE 100, the Home (e)NodeB 300 recognizes that a timer to a membership of the UE 100 (e.g., a CSG timer) has expired (S110). The timer may be operated by the Home (e)NodeB 300, or by an external entity (e.g., a specific entity of the core network 500). In the case that the timer is operated by a specific entity of the core network 500, the Home (e)NodeB 300 may acquire information about the expiration of the timer from the specific entity.

2) Then, the Home (e)NodeB 300 requests and receives an allowed CSG ID list for the UE 100 from the UE 100 (S120-5130). Then, the Home (e)NodeB 300 compares its CSG ID list stored therein, with the allowed CSG ID list received from the UE 100 (S140). Based on a result of the comparison, the Home (e)NodeB 300 determines whether to maintain the UE 100 in the current cell, or to handover the UE 100 to other cell.

Alternatively, the Home (e)NodeB 300 may transmit its CSG ID list to the UE 100. Then, the UE 100 compares its allowed CSG ID list stored therein, with the CSG ID list received from the Home (e)NodeB 300. Based on a result of the comparison, the UE 100 determines whether to stay in the Home (e)NodeB 300, or to perform a handover to other cell.

3) If it is determined in S140 that at least one CSG ID of the allowed CSG ID list of the UE 100 is matched with it in the CSG ID list of the Home (e)NodeB 300, the Home (e)NodeB 300 exchanges information about the matched CSG ID(s) with the core network 500 (S150). The core network 500 or the Home (e)NodeB 300 updates a bearer according to the changed status.

4) If the changed status is updated by the core network 500, the Home (e)NodeB 300 and the UE 100 exchange information about the matched CSG ID(s) with each other (S160). Then, the Home (e)NodeB 300 and the UE 100 update a bearer according to the changed CSG ID. And, the Home (e)NodeB 300 and the UE 100 execute service by using the changed CSG ID.

5) On the contrary, if it is determined in S140 that at least one CSG ID of the allowed CSG ID list of the UE 100 is not matched with it in the CSG ID list of the Home (e)NodeB 300, the UE 100 performs a handover to other suitable CSG cell or macro cell (S170).

FIG. 5 is a flowchart showing a method for controlling access in a Home (e)NodeB operated in a closed access mode according to a second embodiment of the present invention.

According to the second embodiment, the allowed CSG ID list of the UE 100 may be also stored in the core network 500. Accordingly, the Home (e)NodeB 300 acquires the allowed CSG ID list of the UE by request from the core network 500, and then compares the allowed CSG ID list of the UE with its CSG ID list.

This will be explained in more detail with reference to FIG. 5.

1) While the Home (e)NodeB 300 provides service to the UE 100, the Home (e)NodeB 300 recognizes that a timer for a membership of the UE 100 to a specific CSG ID (current CSG ID) of the Home (e)NodeB(e.g., a CSG timer) has expired (S210). The timer may be operated by the Home (e)NodeB 300, or by an external entity (e.g., a specific entity of the core network 500). In the case that the timer is operated by a specific entity of the core network 500, the Home (e)NodeB 300 may acquire information about the expiration of the timer from the specific entity.

2) Then, the Home (e)NodeB 300 requests and receives the allowed CSG ID list of the UE 100 from the UE 100 from the core network 500 (S220-S230). Then, the Home (e)NodeB 300 compares its CSG ID list stored therein, with the allowed CSG ID list of the UE 100 (S240). Based on a result of the comparison, the Home (e)NodeB 300 determines whether to maintain the UE 100 in the current cell, or to handover the UE 100 to other cell.

Alternatively, the Home (e)NodeB 300 may transmit its CSG ID list to the core network 500. Then, the core network 500 compares an allowed CSG ID list of the UE stored therein with the CSG ID list received from the Home (e)NodeB 300. Based on a result of the comparison, the core network 500 determines whether to allow the UE 100 to stay in the Home (e)NodeB 300, or to handover the UE 100 to other cell.

3) If it is determined in S240 that at least one CSG ID of the allowed CSG ID list of the UE 100 is matched with any one in the CSG ID list of the Home (e)NodeB 300, the Home (e)NodeB 300 changes the current CSG ID into the matched CSG ID for the UE 100 and exchanges information about the matched CSG ID(s) with the core network 500 (S250). The core network 500 updates a bearer according to the changed status.

4) If the changed status is updated by the core network 500, the Home (e)NodeB 300 and the UE 100 exchange information about the identical CSG ID(s) with each other (S260). Then, the Home (e)NodeB 300 and the UE 100 update a bearer according to the changed CSG ID. And, the Home (e)NodeB 300 and the UE 100 execute service by using the changed CSG ID.

5) On the contrary, if it is determined in S240 that at least one CSG ID of the allowed CSG ID list of the UE 100 is not matched with it the CSG ID list of the Home (e)NodeB 300, the UE 100 executes a handover to other suitable CSG cell or macro cell (S270).

FIG. 6 is a flowchart showing a method for controlling access in a Home (e)NodeB operated in a closed access mode according to a third embodiment of the present invention.

According to the third embodiment, the allowed CSG ID list of the UE 100 and the CSG ID list of the Home (e)NodeB 300 may be also stored in the core network 500. The third embodiment is different form the first and second embodiments in that a specific entity of the core network 500 directly determines whether to change the CSG ID.

This will be explained in more detail with reference to FIG. 5.

1) While the Home (e)NodeB 300 provides service to the UE 100, a specific entity of the core network 500 recognizes that a timer for a membership of the UE 100 to a specific CSG ID (or current CSG ID) of the Home (e)NodeB 300 (e.g., a CSG timer) has expired (S310). The timer may be operated by the Home (e)NodeB 300, or by other entity of the core network 500. Here, the specific entity of the core network 500 acquires information about the expiration of the timer, from said other entity or the Home (e)NodeB 300.

2) Then, the specific entity of the core network 500 compares the allowed CSG ID list for the UE 100 stored therein, with the CSG ID list of the Home (e)NodeB 300 stored therein (S320). Based on a result of the comparison, the specific entity of the core network 500 determines whether to maintain the UE 100 in the current cell, or to handover the UE 100 to other cell. The specific entity of the core network 500 may include a Mobility Management Entity (MME), a serving GPRS support node (SGSN), a Mobile-services Switching Centre (MSC), a Home Subscriber Server (HSS), a Home Location Register (HLR), a User Repository, etc.

3) If it is determined in S320 that at least one CSG ID in the allowed CSG ID list for the UE 100 is matched with any one in the CSG ID list of the Home (e)NodeB 300, the specific entity of the core network 500 updates a bearer according to the identical CSG ID(s). Then, the specific entity of the core network 500 transmits, to the Home (e)NodeB 300, a request message requesting change of the CSG ID of the UE, and receives a response message with respect to the request message (S330).

4) If the changed status is updated by the specific entity of the core network 500, the Home (e)NodeB 300 and the UE 100 exchange information about the matched CSG ID(s) with each other (S340). Then, the Home (e)NodeB 300 and the UE 100 change the current CSG ID into the matched CSG ID for the UE 100 and update a bearer according to the matched CSG ID. And, the Home (e)NodeB 300 and the UE 100 execute service by using the matched CSG ID.

5) On the contrary, if it is determined in S320 that at least one CSG ID of the allowed CSG ID list for the UE 100 is not matched with any one in the CSG ID list of the Home (e)NodeB 300, the specific entity of the core network 500 handovers the UE to other suitable CSG cell or macro cell (S350).

Figure 7:
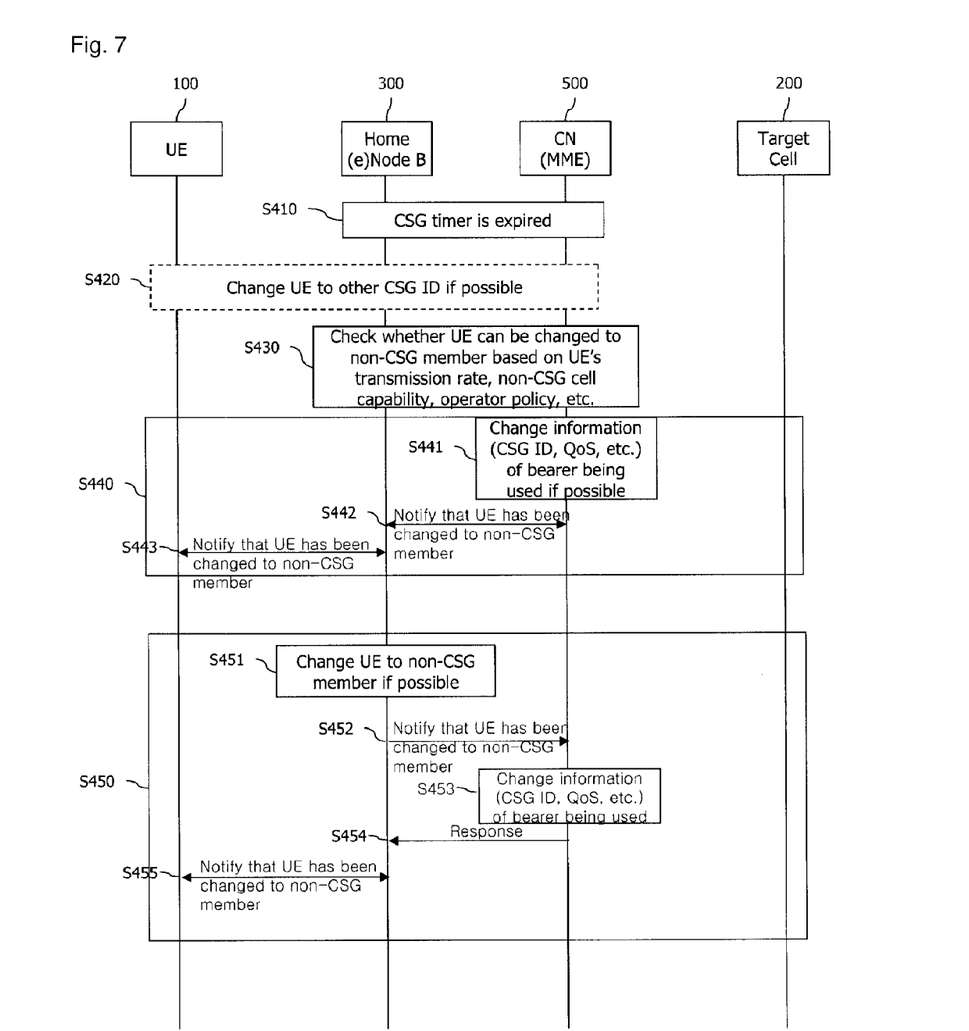
FIG. 7 is a flowchart showing a method for controlling access in a Home (e)NodeB operated in a hybrid access mode according to a fourth embodiment of the present invention.

FIG. 7 is a flowchart showing a method for controlling access in a Home (e)NodeB operated in a hybrid access mode according to a fourth embodiment of the present invention.

In the hybrid access mode, the Home (e)NodeB 300 is operated both in the closed access mode and in the open access mode. The UE 100 may access as a non-CSG member without any permission. However, in this case, the UE 100 corresponding to the non-CSG member may be provided with lower-quality service than that of the CSG member.

If the accessible time (or allowed time) for a membership of UE 100 to the Home (e)NodeB has expired while the UE 100 receives service from the Home (e)NodeB 300 by using the membership, the Home (e)NodeB 300 or the specific entity of the core network 500 changes the UE's membership to a non-CSG member from the CSG member. Accordingly, the UE 100 may be continuously provided with the current service.

For this, it may be checked whether service conditions of the UE such as a bandwidth can be supported even in the non ?CSG member. Here, a bandwidth of service required by the UE 100 may be compared with a resource capability of the non-CSG member.

If the resource capability which the Home (e)NodeB provides to the non-CSG member is high enough to allow the bandwidth of service required by the UE 100, information about a session (or bearer) being used by the UE is changed. Then, the changed information is transmitted to the UE 100, the Home (e)NodeB 300, the network entity, etc. And, the UE 100 is changed to a non-CSG member from the CSG member.

On the contrary, if the resource capability which Home (e)NodeB 300 provides to the non-CSG member is deficient, the UE 100 performs a handover to other suitable CSG cell or macro cell.

Alternatively, if the accessible time has expired while the UE 100 as a CSG member receives service from the Home (e)NodeB 300, it may be determined whether the UE 100 can be changed to a member of other CSG ID before determining whether the UE 100 can be changed to a non-CSG member. If it is determined that the UE 100 can not be changed to a member of other CSG ID, the UE 100 is changed to a non-CSG member for service continuity. This may enhance flexibility of access control.

This will be explained in more detail with reference to FIG. 7.

1) While the Home (e)NodeB 300 provides service to the UE 100, the Home (e)NodeB(300) or the specific entity of the core network 500 recognizes that a timer for a membership of the UE 100 to a specific CSG ID of the Home (e)NodeB (e.g., a CSG timer) has expired (S410). The timer may be operated by the Home (e)NodeB 300.

2) At least one of the Home (e)NodeB 300 and the specific entity of the core network 500 checks whether the UE 100 can be changed to a member of other CSG ID according to a network operator policy, and changes the UE 100 to a member of other CSG ID if so. Then, said at least one of the Home (e)NodeB 300 and the specific entity of the core network 500 transmits a notification message to relevant entities to complete the change operation (S420). Whether the UE 100 can be changed to a member of other CSG ID or not may be selectively determined according to a network operator policy or a network management policy. This is similar to the first to third embodiments shown in FIGS. 4 to 6.

3) If the UE 100 can not be changed to a member of other CSG ID or the change is not allowed under a policy, at least one of the Home (e)NodeB 300 and the specific entity of the core network 500 compares a bandwidth of service being provided to the UE 100 with resources capability which the Home (e)NodeB provides to a non-CSG member. Based on a result of the comparison, it is checked whether the UE 100 can operate in a non-CSG member (S430). Here, the checking may be performed based on an additional operator policy. In a similar manner as 5440, the UE 100 may be operated as a non-CSG member by the specific entity of the core network 500. Alternatively, in a similar manner as 5450, the UE 100 may be operated as a non-CSG member by the Home (e)NodeB 300.

4) Firstly, the specific entity of the core network 500 changes the UE 100 into a non-CSG member (S440). More concretely, the specific entity of the core network 500 changes a session (or bearer) with the UE, and changes a CSG ID or membership, QoS, etc. (S441). Then, the specific entity of the core network 500 informs, to the Home (e)NodeB 300, that the UE has been changed to a non-CSG member (S442). Subsequently, the Home (e)NodeB 300 informs, to the UE 100, that the UE has been changed to a non-CSG member (S443).

5) Alternatively, if the UE 100 can be operated as a non-CSG member, the Home (e)NodeB 300 changes the UE 100 into a non-CSG member (S450).

More concretely, the Home (e)NodeB 300 changes the UE 100 to a non-CSG member (S451), and informs, to the specific entity of the core network 500, that the UE 100 has been changed to a non-CSG member (S452). Then, the specific entity of the core network 500 changes a session (or bearer) with the UE, and transmits a response message to the Home (e)NodeB 300 (S454). Once the response message is received, the Home (e)NodeB 300 informs, to the UE 100, that the UE 100 has been changed to a non-CSG member (S455). The Home (e)NodeB 300 may receive accessible time information of the UE to the CSG by request from the core network 500, or may use the existing information stored therein after being received from the core network 500.

If the UE 100 can not be changed to a non-CSG member, the UE 100 may perform a handover to other CSG cell or macro cell.

Figure 8:
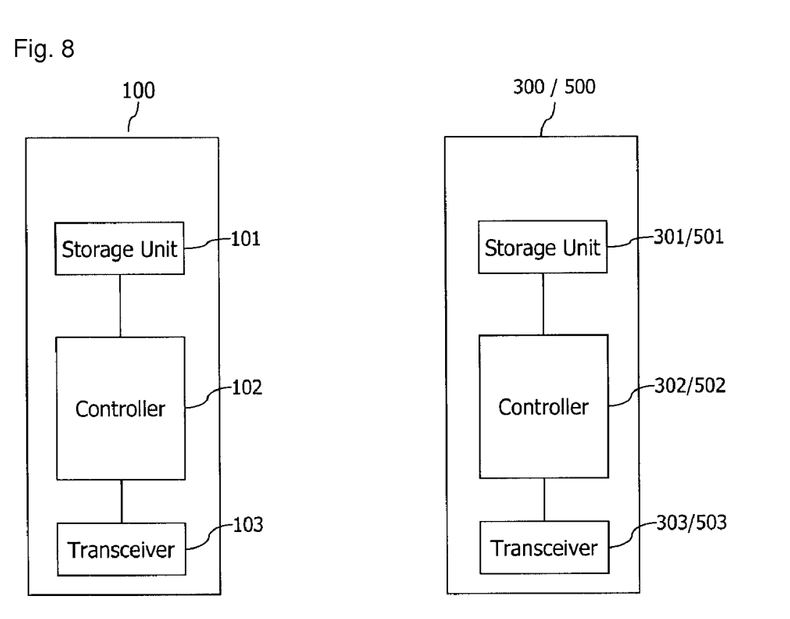
FIG. 8 is a block diagram showing a UE 100, a Home (e)NodeB 300, and a core network 500 according to the present invention.

FIG. 8 is a block diagram showing the UE 100, the Home (e)NodeB 300, and the core network 500 according to the present invention.

Referring to FIG. 8, the UE 100 includes a storage means 101, a controller 102, and a transceiver 103.

The Home (e)NodeB 300 and each entity of the core network 500 include storage means 301/501, controllers 302/502, and transceivers 303/503, respectively.

The storage means 301/501 store software programs including the method shown in FIGS. 4 to 7.

Each of the controllers 302/502 controls the storage means and the transceivers. More concretely, the controllers execute software programs including the method and stored in the storage means. And, each of the controllers transmits the aforementioned signals through the transceivers.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for controlling access of a terminal, which is connected to a Home (e)NodeB operated in a closed access mode, the method comprising:
   determining whether a timer, which designates allowable time to access the Home (e)NodeB by using a specific closed subscriber group (CSG) ID, has expired;
   requesting a CSG ID list of the Home (e)NodeB if the timer has expired;

comparing an allowed CSG list for the terminal with the requested CSG ID list of the Home (e)NodeB if the timer has expired; and then changing the specific CSG ID of the terminal into another CSG ID such that service to the terminal from the Home (e)NodeB is maintained if there is the another CSG ID in both the allowed CSG ID list for the terminal and the CSG ID list of the Home (e)NodeB.

2. The method of claim 1, wherein at least one of the determining, comparing, and changing is executed by at least one of the Home (e)NodeB and a specific entity of a core network.

3. The method of claim 1, wherein the step of determining comprises:

receiving a message notifying that the timer has expired, from a specific entity, which is located in a core network that monitors the timer.

4. The method of claim 1, wherein the step of determining comprises monitoring the allowed access timer by the Home (e)NodeB.

5. The method of claim 1, further comprising requesting and acquiring the allowed CSG ID list for the terminal when the timer has expired.

6. The method of claim 5, wherein the allowed CSG ID list of the terminal is acquired by request from the terminal or a Mobility Management Entity (MME).

7. The method of claim 1, wherein the step of comparing comprises:

requesting and acquiring, by the Home (e)NodeB, the allowed CSG ID list of the terminal from the terminal; and comparing, by the Home (e)NodeB, the acquired allowed CSG ID list with the CSG ID list of the Home (e)NodeB.

8. The method of claim 1, wherein the step of comparing comprises:

acquiring and requesting, by the Home (e)NodeB, the allowed CSG ID list of the terminal from a Mobility Management Entity (MME); and comparing, by the Home (e)NodeB, the acquired allowed CSG ID list with the CSG ID list of the Home (e)NodeB.

9. The method of claim 1, wherein the step of changing comprises:

transmitting, by the Home (e)NodeB, to the terminal and a core network a message for changing the specific CSG ID of the terminal to said another CSG ID.

10. A method for controlling access of a terminal, which is connected to a Home (e)NodeB operated in a closed access mode, the method comprising:

requesting a CSG ID list of the Home (e)NodeB if a timer which designates allowable time to access the Home (e)NodeB by using a specific CSG ID has expired;

comparing the requested CSG ID list of the Home (e)NodeB with an allowed CSG ID list for the terminal when the CSG ID list of the Home (e)NodeB has been acquired; and then changing the specific CSG ID of the terminal into another CSG ID such that service to the terminal from the Home (e)NodeB is maintained if there is the another CSG ID in both the allowed CSG ID list for the terminal and the CSG ID list of the Home (e)NodeB.

11. The method of claim 10, wherein the Home (e)NodeB is a Home Node B or a Home eNode B.

12. The method of claim 10, further comprising receiving a message notifying that the timer has expired.

13. A terminal for accessing a Home (e)NodeB operated in a closed access mode by using a specific CSG ID, the terminal comprising:

a transceiver configured to request and acquire a CSG ID list of the Home (e)NodeB if a timer which designates allowable time to access the Home (e)NodeB by using the specific CSG ID has expired; and a controller adapted to compare the requested CSG ID list of the Home (e)NodeB with an allowed CSG ID list for the terminal when the CSG ID list of the Home (e)NodeB has been acquired;

wherein the controller controls the transceiver to request change of the specific CSG ID of the terminal into another CSG ID when the timer expires such that service to the terminal from the Home (e)NodeB is maintained if there is the another CSG ID in both the allowed CSG ID list for the terminal and the CSG ID list of the Home (e)NodeB.

* * * * *